United States Patent
Ozawa et al.

(10) Patent No.: US 6,617,094 B2
(45) Date of Patent: *Sep. 9, 2003

(54) LASER-MARKING LAMINATED STRUCTURE AND LASER-MARKED LAMINATED STRUCTURE

(75) Inventors: Atsuya Ozawa, Tokyo-to (JP); Kazuyoshi Hayashi, Tokyo-to (JP); Koji Shimizu, Tokyo-to (JP); Masahiro Shimoyamada, Tokyo-to (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/739,996

(22) Filed: Oct. 30, 1996

(65) Prior Publication Data

US 2002/0051930 A1 May 2, 2002

(30) Foreign Application Priority Data

Nov. 2, 1995 (JP) .............................................. 7-309880

(51) Int. Cl.[7] .............................................. B42D 15/10
(52) U.S. Cl. .................................... 430/270.1; 430/945
(58) Field of Search ............................. 430/945, 270.1; 156/238, 272.8; 219/121.68, 121.69

(56) References Cited

U.S. PATENT DOCUMENTS 4,515,867 A * 5/1985 Bleacher et al. ............ 428/204
4,808,966 A * 2/1989 Ferlier et al. .......... 219/121.68

FOREIGN PATENT DOCUMENTS

| FR | 2 575 114 | | 6/1986 | |
|---|---|---|---|---|
| GB | 2240948 | * | 8/1991 | |
| JP | 59-14993 | * | 1/1984 | |
| JP | 62-203691 | * | 9/1987 | |
| JP | 63-205291 | * | 8/1988 | ............ 219/121.68 |
| JP | 62-203692 | * | 9/1997 | |

OTHER PUBLICATIONS

Randon House Collegiate Dictionary, (1973) pp. 1456.*

* cited by examiner

Primary Examiner—Martin Angebranndt
(74) Attorney, Agent, or Firm—Parkhurst & Wendel, L.L.P.

(57) ABSTRACT

A laser-marking laminated structure has at least a base layer (2), a masking layer (3) capable of being removed by irradiation with a laser beam, and an OP layer (4) formed in that order on a support element (1). The base layer and the masking layer are colored layers having colors distinctly different from each other in lightness. The laser-marking laminated structure is irradiated with a laser beam in a desired pattern including characters to remove portions of the masking layer (3) and the OP layer (4) corresponding to the pattern so that the pattern is displayed clearly on the laser-marking laminated structure because of the contrast between the color of the base layer (2) and that of the masking layer (4).

5 Claims, 2 Drawing Sheets

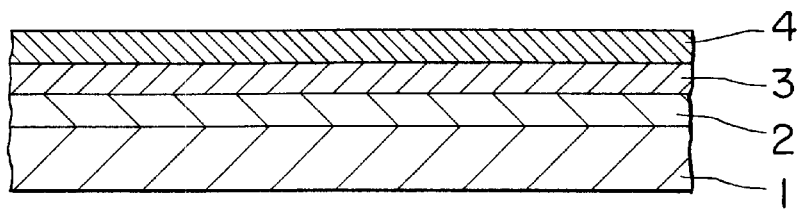
F I G. 1
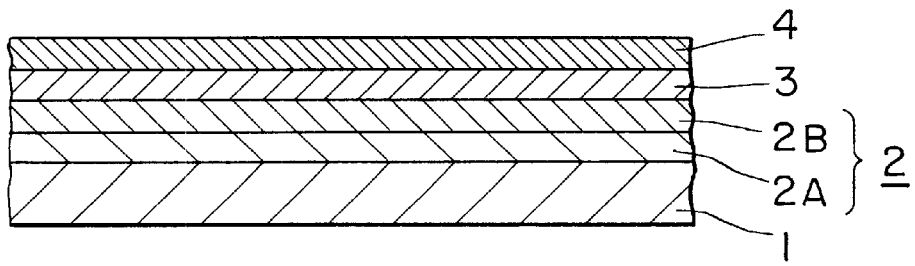
F I G. 2
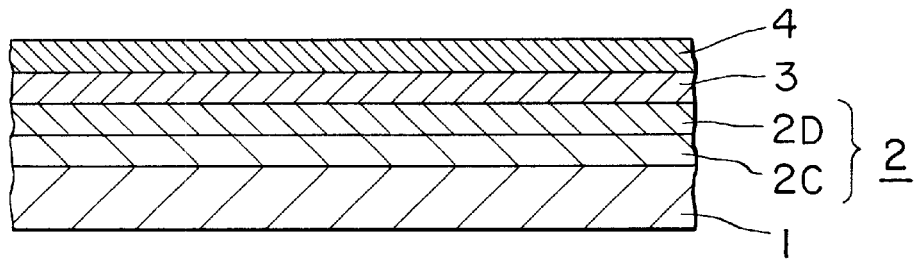
F I G. 3
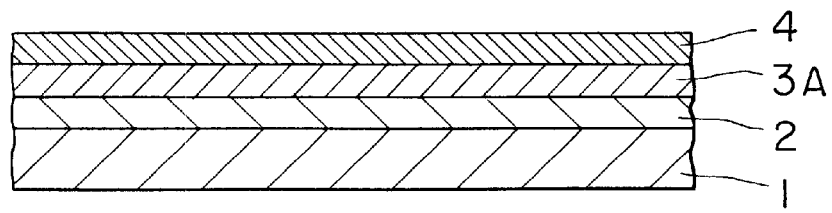
F I G. 4

LASER-MARKING LAMINATED STRUCTURE AND LASER-MARKED LAMINATED STRUCTURE

BACKGROUND OF THE INVENTION

1. Field of the Invention

The present invention relates to a laser-marking laminated structure, and a laser-printed laminated structure. More specifically, the present invention relates to a laser-marking laminated structure, capable of being printed at a high printing speed by irradiation with a laser beam to form a clear image having excellent weather resistance, scratch resistance, water resistance and chemical resistance, and a laser-marked laminated structure obtained by printing an image on the laminated structure.

2. Description of the Related Art

Conventional printing methods include, for example, a first printing method that transfers a solution type ink to an image carrying medium by a printing plate bearing a relief, intaglio or planographic printing surface and dries the printed ink, a second printing method that prints images by a thermal transfer system using an ink ribbon and a thermal transfer printer, and a third printing method that prints images by jetting particles of liquid ink through fine nozzles.

These conventional printing methods, however, are encountered by difficulties in dealing with progressively increasing process speed of production lines, job shop type production and demand for labor saving in, for example, printing manufacturing date, quality guarantee limit date, lot number, plant name and such on product labels, cartons or plastic pouches in contents filling and packaging lines.

More specifically, the first printing method requires much labor for maintenance work for changing the printing plate, replenishing the printer with the ink and controlling the viscosity of the ink. Since the ink takes much time for drying, there is a limit to the first method in application to high-speed production lines and problems are liable to arise in the adhesion and abrasion resistance of the printed ink.

The second printing method does not use liquid ink and hence does not need any work for the control of the viscosity of the ink and time for drying the printed ink, However, the ink ribbon needs to be changed and hence the method is not necessarily satisfactory in application to a high-speed production line. Moreover, there are restrictions on the shape of image carrying mediums which can be printed by the second printing method and needs an increased printing cost.

The third printing method is capable of meeting requirements of high-speed printing and of clear printing. Therefore, the third method is capable of dealing with high-speed production lines. However, the use of the liquid ink in a production line is undesirable in view of maintaining a sanitary environment, the third method has problems in the facility of maintenance work including ink changing work, the nozzles of the ink-jet print head are liable to be stopped up with the ink and the percentage of defective prints is liable to increase.

Those disadvantages of the conventional printing methods become conspicuous particularly when the image carrying medium is a product label to be attached to a bottle for containing a liquid, such as water, a beverage or an alcoholic drink. Generally, a bottling line for bottling a beverage or the like operates at a high process speed and, in many cases, hot contents are bottled in the bottling line. After being filled with the contents, sealed and labeled, bottles strike together while being conveyed. In some cases, the bottles are coated with a bottle protecting liquid or immersed in cold water to cool the contents, and hence the product labels also are exposed to such severe conditions Therefore, printed portions of the labels need to be capable of withstanding such severe conditions.

The following methods, by way of example, have been proposed and put to practical use to indicate the month and year of manufacture of the bottled beverage and the like on a product label meeting such a requirement. A first method prints items to be indicated including months and years together with patterns in the periphery of a product label beforehand, and forms notches in portions of the product label in which relevant items are printed (clips off portions of the product label in which relevant items are printed) when filling a bottle bearing the product label with a beverage or the like. A second method forms a layer of a laser-coloring ink in an indicating area of a product label by printing, and irradiates the indicating area with a laser beam to print relevant items in the indicating area. A third method forms a layer of a laser light absorbing color ink which absorbs laser light, generates heat and decomposes upon absorption of the laser light and disappears in an indicating area of a product label, and irradiates the indicating area with the laser beam to remove portions of the layer of the laser beam absorbing color ink corresponding to a relevant image including characters and/or patterns so that the image is indicated in the color of a support element (paper sheet) of the product label in contrast with the color of the laser light absorbing color ink.

Those previously proposed techniques of indication and printing still have problems. For example, when notches are formed in the product label (when portions of the product label are clipped off), clippings are produced and the product label is liable to be torn from notched portions after being attached to a bottle.

Although the method that prints an indicating area with the laser-coloring ink and irradiates the indicating area with a laser beam to form characters and patterns by making the laser-coloring ink develop a color is suitable for high-speed printing, the laser-coloring ink is inferior in light fastness and chemical resistance. Particularly, the laser-coloring ink discolors when exposed to ultraviolet rays. Moreover, this method needs the regulation of the output of a laser. When the product label has an overcoating layer and the product label is irradiated with an excessively intensive laser beam, the overcoating layer is destructed and printed characters and patterns fade away when a bottle protecting liquid is applied to the product label.

Although the third method, which forms a layer of a laser light absorbing color ink which absorbs laser light, generates heat and decomposes upon absorption of the laser light and disappears in an indicating area of a product label, and irradiates the indicating area with the laser beam to remove portions of the layer of the laser light absorbing color ink corresponding to a relevant image so that the relevant image is indicated in the color of the support element (paper sheet) of the product label in contrast with the color of the laser light absorbing color ink, is suitable for high-speed printing, the clearness of the thus printed image is not somewhat unsatisfactory, and the scratch resistance and water resistance of the printed portions of the product label are not high enough to withstand severe conditions because portions of an overcoating layer and the ink layer are removed completely.

SUMMARY OF THE INVENTION

Accordingly, it is an object of the present invention to provide a laser-marking laminated structure, capable of developing a clear image excellent in scratch resistance, water resistance and chemical resistance at a high printing speed when irradiated with a laser beam.

Another object of the present invention is to provide a printed laminated structure obtained by irradiating a laser-marking laminated structure, capable of developing a clear image excellent in scratch resistance, water resistance and chemical resistance at a high printing speed when irradiated with a laser beam.

The inventors of the present invention made earnest studies to solve the foregoing problems and have made the present invention on the basis of the following findings obtained by the studies.

When a laminated structure having at least a support element, a base layer having a first color formed on a surface of the support element, and a laser light absorbing masking layer having a second color distinctly different from the first color in lightness and formed on the base layer, such as a white ink layer and a black ink layer, or a black ink layer and a silver ink layer, is irradiated with a laser beam of an appropriate intensity from the side of the laser light absorbing concealing layer to remove portions of the laser light absorbing masking layer corresponding to a desired pattern including characters, the pattern can clearly be displayed by distinct color contrast between the base layer and the masking layer, and the base layer remaining on the support element protects the support layer and, therefore, both the pattern and the support layer are resistant to various detrimental actions.

According to a first aspect of the present invention, a laser-marking laminated structure comprises, as essential components, a support element, a base layer formed on a surface of the support element, and a masking layer which can be decomposed and removed by irradiation with a laser beam, formed on the base layer.

According to the present invention, the base layer and the masking layer may be colored layers of colors distinctly different from each other in lightness, the base layer may be of a multilayer structure having at least an upper base layer and a lower base layer, the upper base layer may have a laser light absorptive power, and the lower base layer may be colored in a color similar to that of the upper base layer and capable of transmitting laser light.

According to the present invention, the masking layer may be an ink layer containing a metal powder.

According to the present invention, the base layer may be a two-layer layer structure having an upper base layer and a lower base layer, the upper base layer may be an ink layer containing carbon black, and the lower base layer may be an ink layer containing a coloring matter other than carbon black.

BRIEF DESCRIPTION OF THE DRAWINGS

The above and other objects, features and advantages of the present invention will become more apparent from the following description taken in connection with the accompanying drawings, in which:

FIG. 1 is a sectional view of a laser-marking laminated structure in a first embodiment according to the present invention;

FIG. 2 is a sectional view of a laser-marking laminated structure in a second embodiment according to the present invention;

FIG. 3 is a sectional view of a laser-marking laminated structure in a third embodiment according to the present invention;

FIG. 4 is a sectional view of a laminated structure for laser-marking in a fourth embodiment according to the present invention;

DETAILED DESCRIPTION OF THE PREFERRED EMBODIMENTS

Figure 5:
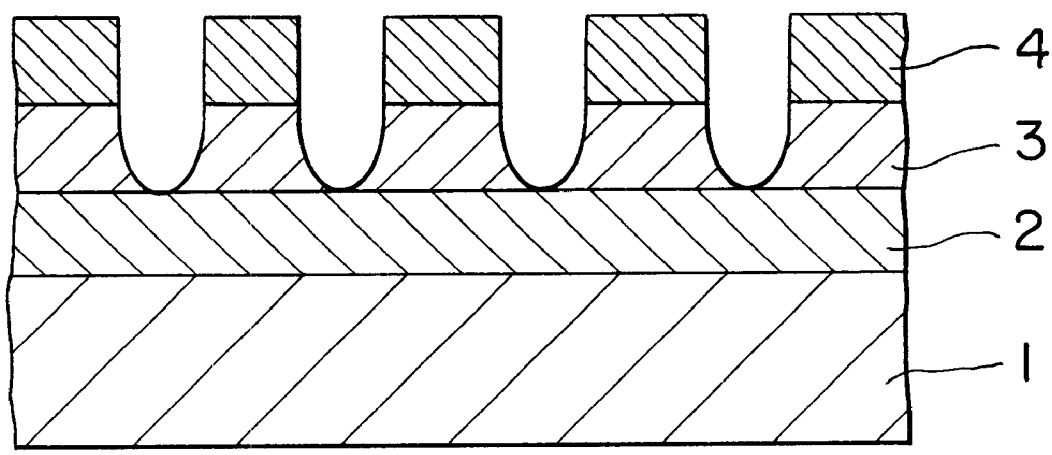
FIG. 5 is a sectional view of a laser-marked laminated structure of the present invention printed with a laser beam.

Basically, laser-marking laminated structures in accordance with the present invention utilize the difference between the component layers thereof in laser light absorptive power. A laser beam of 10.6 $\mu$m in wavelength emitted by a $CO_2$ laser is suitable for marking an image on laminated structures of the present invention. Carbon black by way of example absorbs this laser beam effectively, and titanium oxide (white) or an ordinary coloring matter for printing ink, other than carbon black does not absorb the laser beam very effectively. Therefore, when irradiated with the laser beam, a colored layer containing carbon black absorbs the laser beam and generates heat, whereas a colored layer containing titanium oxide or the like does not absorb the laser beam effectively and does not generate much heat.

Therefore, when a pattern including characters is written to a colored layer having a laser absorptive power with the laser beam of a controlled intensity, irradiated portions of the colored layer generate heat, melt and evaporate or the colored layer generates heat, decomposes and ashes to form the pattern. However, a colored layer having a low laser light absorptive power does not generate much heat and does not disappear when irradiated with the laser beam unless the intensity of the laser beam is excessively high. A pattern can satisfactorily be marked on a laminated structure of the present invention when the intensity of the laser beam emitted by the $CO_2$ laser is controlled so that the energy density of the laser beam on the surface of the laminated structure is in the range of 0.5 to 2.0 $J/cm^2$.

A laser-marking laminated structure of the present invention utilizes the selective laser light absorbing performances of its component layers to form a clear pattern by laser-marking. The laser-marking laminated structure of the present invention comprises, as essential components, a support element, a base layer formed on one surface of the support elementy, and a masking layer formed on the base layer. For example, the base layer formed on one surface of the support element is a white ink layer containing titanium oxide having a low laser light absorptive power, and the masking layer is an ink layer containing carbon black having a high laser light absorptive power and having a high hiding power. When the laser-marking laminated structure is irradiated with the laser beam from the side of the masking layer, portions of the black masking layer irradiated with the laser beam generate heat and disappear and portions of the white base layer corresponding to the disappeared portions of the masking layer are exposed in a clear white pattern sharply contrasting with the black masking layer.

As mentioned above, when the laser-marking laminated structure of the present invention is intended to be used as a marking portion of a foundation, such as a product label, a carton or a packaging material, such as a plastic pouch, it is preferable that the marking portion is excellent as well as other portions of the foundation bearing patterns and pictures in appearance, design and resistance to environmental conditions. Therefore, the laser-marking laminated structure may comprise more than three layers.

For example, when the support element is a paper sheet or a paperboard, the paper sheet or the paperboard may be used as it is or the paper sheet or the paperboard may be a laminated paper sheet or a laminated paperboard formed by laminating, for example, an aluminum foil or a plastic film to the surface of a paper sheet or a paperboard. The support element may be a simple plastic film or a laminated plastic film formed by laminating a plurality of component plastic films.

The masking layer may be coated with an overprint layer (hereinafter referred to as "OP layer" or "OP varnish layer") to improve the scratch resistance and other resistances to detrimental conditions of the laser-marking laminated structure. The laser-marking laminated structure may be provided with a plurality of base layers and a plurality of masking layers.

For example, when an ink layer of a color other than black is preferred as the masking layer in view of design, the masking layer may be formed by superposing a colored layer of a color other than black on a black ink layer, or may be an ink layer of an ink containing a metal powder having a high hiding power, such as a silver ink.

When the masking layer is formed from an ink containing a metal powder, such as a silver ink, the base layer underlying the masking layer may be formed in a two-layer structure consisting of an ink layer containing carbon black as an upper base layer, and a color ink layer not containing carbon black as a lower base layer, because the masking layer of a silver ink or the like has a low laser light absorptive power. When the laser-marking laminated structure is thus formed, the black ink layer containing carbon black and serving as the upper base layer generates heat when irradiated with a laser beam even if the silver ink layer serving as the masking layer is coated with an OP layer. Then, portions of the masking layer and the OP layer corresponding to irradiated portions of the upper base layer are caused to evaporate by the heat generated in the upper base layer, whereby a pattern is formed on the laser-marking laminated structure. Since the base layer is masked with the silver ink layer serving as the masking layer, it may be conjectured that the laser beam is intercepted by the silver ink layer and is unable to strike the upper base layer containing carbon black. Practically, it is inferred that the laser beam penetrates through gaps between the silver particles of the silver ink layer or is reflected by the silver particles and reaches the upper base layer. Therefore, sufficient heat is generated in the upper base layer, and a clear black pattern sharply contrasting with the silver ink layer can be formed. Preferred embodiments of the present invention will be described hereinafter with reference to the accompanying drawings. FIGS. 1 to 4 are sectional views of laser-marking laminated structures in accordance with the present invention, in which like or corresponding parts are designated by the same reference characters.

Referring to FIG. 1, a laser-marking laminated structure in a first embodiment according to the present invention has a support element 1, and at least three layers, i.e., a base layer 2 formed on one surface of the support element 1, a masking layer 3 formed on the base layer 2, and an OP layer 4 formed on the masking layer 3. The masking layer 3 can be removed by irradiation with a laser beam.

Referring to FIG. 2, a laser-marking laminated structure in a second embodiment according to the present invention has a support element 1, a two-layer base layer 2 consisting of a lower base layer 2A formed on one surface of the support element 1 and an upper base layer 2B formed on the lower base layer 2A, a masking layer 3 formed on the base layer 2, and an OP layer 4 formed on the masking layer 3 The lower base layer 2A has a color similar to that of the upper base layer 2B and is capable of transmitting a laser beam. The upper base layer 2B has a laser light absorptive power.

Referring to FIG. 3, a laser-marking laminated structure in a third embodiment according to the present invention has a base element 1, a two-layer base layer 2 formed on one surface of the support element 1, a masking layer 3 formed on the two-layer base layer 2, and an OP layer formed on the masking layer 3. The two-layer base layer 2 consists of an upper black ink layer 2D containing carbon black, and a lower base layer 2C of an ink of a color other than black.

Referring to FIG. 4, a laser-marking laminated structure in a fourth embodiment according to the present invention has a base element 1, a base layer 2 formed on one surface of the support element 1, a masking layer 3A of an ink containing a metal powder formed on the base layer 2, and an OP layer 4 formed on the masking layer 3A.

The foregoing laser-marking laminated structures illustrated in FIGS. 1 to 4 are only examples and the present invention is not limited thereto. The base layers 2, 2A, 2B, the masking layers 3, 3A and the OP layers 4 may be of any suitable constructions and of any suitable materials.

A method of marking an image on a laser-marking laminated structure of the present invention will be described hereinafter. The laser-marking laminated structure is irradiated with a laser beam emitted by a known laser to remove portions of the OP layer 4 and the masking layer 3, 3A corresponding to a desired image to be printed so that portions of the surface of the base layer 2, 2A, 2B corresponding to the irradiated portions of the OP layer 4 and the masking layer 3, 3A are exposed to display the image in the color of the base layer 2, 2A, 2B contrasting with that of the masking layer 3, 3A.

Figure 6:
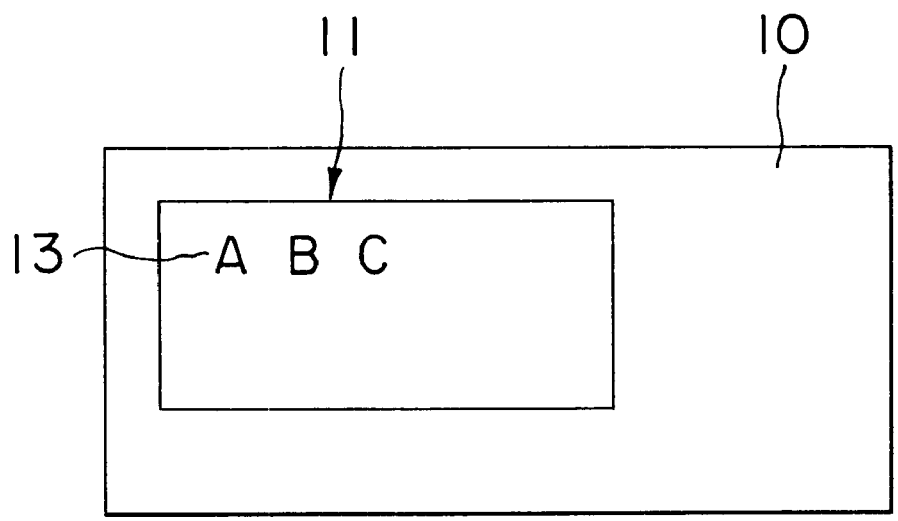
FIG. 6 is a front view of a product label incorporating a laser-marked laminated structure of the present invention.

Referring to FIG. 5, when a laser-marking laminated structure provided with a functional structure having at least a base layer 2, a masking layer 3 that can be removed by irradiation with a laser beam and an OP layer 4 formed in that order on a support element 1 is irradiated with the laser beam, irradiated portions of the masking layer 3 and the OP layer 4 are removed and a desired image 13 (FIG. 6) is printed on the laser-marking laminated structure. The image is displayed in the color of the base layer 2 contrasting with that of the masking layer 3. Thus, a printed laminated structure 11 bearing the image 13 as shown in FIG. 6 is obtained The printed laminated structure 11 forms part of a label 10.

As mentioned above, the laser beam is employed in printing the laser-marking laminated structure is a laser beam emitted by a $CO_2$ laser. The image 13 can be formed in a satisfactorily print quality when the intensity of the laser beam is controlled so that the energy density of the laser beam on the laser-marking laminated structure is in the range of 0.5 to 2.0 $J/cm^2$.

Although the mechanism of image formation of the laser-marking laminated structure of the present invention when irradiated with the laser beam is obscure, it is inferred that a laser light absorbing layer absorbs laser light when irradiated with the laser beam and generates heat, and irradiated portions of the laser light absorbing layer are caused to melt, evaporate or effect some phenomena by the heat generated therein to form the image on the laser-marking laminated structure.

The present invention will more specifically be described herein after in connection with its examples.

EXAMPLE 1

An aluminum-metallized paper sheet available from Honshuu Seishi K.K. was used as a support element. A 3 μm thick white ink layer was formed on an aluminum-metallized surface of the aluminum-metallized paper sheet by coating the aluminum-metallized surface with a white ink IBL-962 available from The Inktec Co., Ltd. and containing a polyamide resin as vehicle, and 30% titanium oxide by gravure printing. Then a 3 μm thick black ink layer was formed on the white ink layer by coating the white ink layer with a black ink IBL-991 available from The Inktec Co., Ltd. and containing a polyamide resin as vehicle containing 12% carbon black by gravure printing. Next, an about 1 μm thick OP varnish layer was formed on the black ink layer by coating the surface of the black ink layer with an OP varnish containing 18% nitrocellulose by gravure printing to fabricate a laser-marking laminated structure of a construction shown below.

OP varnish layer/Black ink layer/White ink layer/Aluminum-metallized paper sheet

EXAMPLE 2

A laser-marking laminated structure in Example 2 of a construction shown below was fabricated. The laser-marking laminated structure in Example 2 is the same in components as that in Example 1, except that the positions of the white ink layer and the black ink layer in Example 2 are reverse to those of the same layers in Example 1.

OP varnish layer/White ink layer/Black ink layer/Aluminum-metallized paper sheet

EXAMPLE 3

A laser-marking laminated structure in Example 3 of a construction shown below was fabricated. The laser-marking laminated structure in Example 3 is the same in components and construction as that in Example 2, except that Example 3 is provided with a toned color ink layer of a color-toned polyamide resin as vehicle containing yellow, vermilion and indigo organic pigments instead of the black ink layer of the black ink containing carbon black.

OP varnish layer/White ink layer/Toned-color ink layer/Aluminum-metallized paper sheet

EXAMPLE 4

An aluminum-metallized paper sheet available from Honshuu Seishi K.K. was used as a support element. A 3 μm thick black ink layer was formed on an aluminum-metallized surface of the aluminum-metallized paper sheet by coating the aluminum-metallized surface with a black ink IBL-991 available from The Inktec Co., Ltd. and containing a polyamide resin as vehicle, and 12% carbon black by gravure printing. Then a 3 μm thick silver ink layer was formed on the black ink layer by coating the black ink layer with a silver ink available from The Inktec Co., Ltd. and containing a polyamide resin as vehicle containing 6% leafing aluminum paste containing aluminum particles of 6 μm grain size as pigment by gravure printing. Next an about 1 μm thick OP varnish layer was formed on the silver ink layer by coating the surface of the silver ink layer with an OP varnish containing 18% nitrocellulose by gravure printing to fabricate a laser-marking laminated structure of a construction shown below.

OP varnish layer/Silver ink layer/Black ink layer/Aluminum-metallized paper sheet

EXAMPLE 5

A laser-marking laminated structure in Example 5 of a construction shown below was fabricated. The laser-marking laminated structure in Example 5 is the same in components and construction as that in Example 4, except that Example 5 is provided with a toned color ink layer of a color-toned polyamide resin as vehicle containing yellow, vermilion and indigo organic pigments instead of the black ink layer of the black ink containing carbon black.

OP varnish layer/Silver ink layer/Toned-color ink layer/Aluminum-metallized paper sheet

EXAMPLE 6

Layers of 3 μm in thickness were formed on an aluminum-metallized paper sheet available from Honshu Seishi K.K. by printing the color-toned ink containing a polyamide resin as vehicle employed in Example 5, the black ink IBL-991 containing a polyamide resin as vehicle and carbon black as pigment employed in Example 4, and the silver ink containing a polyamide resin as vehicle, which are available from The Inktec Co. Ltd. Then, an about 1 μm thick OP varnish layer was formed by coating the silver ink layer with an OP varnish containing 18% nitrocellulose by gravure printing to fabricate a laser-marking laminated structure of a construction shown below.

OP varnish layer/Silver ink layer/Black ink layer/Toned-color ink layer/Aluminum-metallized paper sheet

EXAMPLE 7

A laser-marking laminated structure in Example 7 is the same in components and construction as that in Example 6, except that Example 6 is provided with a vermilion ink layer of a vermilion ink IBL-121 containing a polyamide resin as vehicle and available from The Inktec Co., Ltd.

OP varnish layer/Silver ink layer/Black ink layer/Vermilion ink layer/Aluminum-metallized paper sheet

Comparative Example 1

A 3 μm thick black ink layer was formed on an aluminum-metallized surface of an aluminum-metallized paper sheet available from Honshyu Seishi K.K. by coating the aluminum-metallized surface with a black ink IBL-991 available from The Inktec Co., Ltd. and containing a polyamide resin as vehicle, and 12% carbon black as pigment by gravure printing, and an about 1 μm thick OP varnish layer was formed on the black ink layer by coating the surface of the black ink layer with an OP varnish containing 18% nitrocellulose by gravure printing to fabricate a laser-marking laminated structure of a construction shown below.

OP varnish layer/Black ink layer/Aluminum-metallized paper sheet

Comparative Example 2

A 3 μm thick laser-coloring ink layer was formed on an aluminum-metallized surface of an aluminum-metallized paper sheet available from Honshyu Seishi K.K. by coating the aluminum-metallized surface with a laser-coloring leuco ink available from Dai Nippon Inki Kagaku Kogyo K.K., and an about 1 μm thick Op varnish layer was formed on the laser-coloring ink layer by coating the surface of the laser-coloring ink layer with an OP varnish containing 18% nitrocellulose by gravure printing to fabricate a laser-marking laminated structure of a construction shown below.

OP varnish layer/Laser-coloring ink layer/Aluminum-metallized paper sheet

Performance Tests

The laser-marking laminated structures in Examples 1 to 7 and Comparative examples 1 and 2 were tested to evaluate their performance. Test results are tabulated in Table 1.

1. Printing Test

The laser-marking laminated structures in Examples 1 to 7 and Comparative example 1 and 2 were irradiated from the side of the OP varnish layer with a laser beam emitted by LASER MARK 920 (Lumonics Co., Canada), a TEA $CO_2$ laser, in an energy density of 0.3 $J/CM^2$ on the surface of each laser-marking laminated structure through a mask by one-shot marking, and the visibility of characters formed on the laser-marking laminated structures were evaluated by visual observation.

2. Bottle Coating Resistance Test

A bottle coating liquid was applied to the laser-marking laminated structures bearing the characters thus marked, and the condition of the characters marked on the laser-marking laminated structures was observed 30 min after the application of the bottle coating liquid to the laser-marking laminated structures.

3. Weather Resistance Test

The laser-marking laminated structures were exposed to visible-ultraviolet radiations for 24 hr by using a xenon weathermeter (Zuka Shiken-ki K.K.).

TABLE 1

|  | Printing Test | Bottle Coating Resistance Test | Weathering Resistance Test |
|---|---|---|---|
| Example 1 | Δ | ◎ | ◎ |
| Example 2 | Δ | Δ | ◎ |
| Example 3 | Δ | Δ | ◎ |
| Example 4 | ◎ | ○ | ◎ |
| Example 5 | ◎ | ○ | ◎ |
| Example 6 | ◎ | ◎ | ◎ |
| Example 7 | ◎ | ◎ | ◎ |
| Comp. Example 1 | X | ◎ | ◎ |
| Comp. Example 2 | ○ | X | ◎ |

In Table 1, symbols signifies the following grades.

1. Printing Test

◎: Very clearly recognizable

○: Fairly clearly recognizable

Δ: Recognizable

X: Hardly recognizable

2. Bottle Coating Resistance

◎: Perfectly resistant

○: Fairly resistant

Δ: Partly eroded and aluminum layer was exposed

X: Completely eroded and aluminum layer was exposed

3. Weathering Resistance

◎: Condition was not changed at all

X: Both printed portions and nonprinted portions turned yellow and characters were partly effaced.

As is obvious from Table 1, the laser-marking laminated structures of the present invention are excellent in coloring performance, bottle coating resistance and weather resistance.

The coloring performance of the laser-marking laminated structures in Examples 4 to 7 is particularly excellent, and the laser-marking laminated structures in Examples 6 and 7, in particular, further have excellent bottle coating resistance.

Although excellent in bottle coating resistance and weather resistance, the laser-marking laminated structure in Comparative example 1 is quite inferior in coloring performance; the recognizability of characters formed on the laser-marking laminated structure in Comparative example 1 was not satisfactory when a laser beam of 0.8 $J/cm^2$ was used.

Although satisfactory in coloring performance when a heat-sensitive ink is used, characters formed on the laser-marking laminated structure in Comparative example 2 were effaced and the ink came off when the laser-marking laminated structure was wetted with the bottle coating liquid. Both printed portions and nonprinted portions turned yellow and the characters were partly effected when the laser-marking laminated structure was subjected to the weather resistance test.

As is apparent from the foregoing description, according to the present invention, the laser-marking laminated structure comprises, as essential components, the support element, the base layer formed on a surface of the support element, and the masking layer which can be decomposed and removed by irradiation with a laser beam, formed on the base layer, the base layer and the masking layer are those of inks of different colors distinctly differing in lightness from each other, such as a white ink and a black ink, or a black ink and a silver ink, respectively, the laser-marking laminated structure is capable of forming an clear image of the color of the base layer distinctly contrasting with that of the masking layer when irradiated with a laser beam to remove portions of the masking layer corresponding to the image, the printed portions and the support element are resistant to various detrimental actions because the base layer remains on the support element to protect the support element.

What is claimed is:

1. A laser-marking laminated structure consisting of:

a support element;

a base layer formed on one surface of the support element;

a masking layer formed on an exposed surface of the base layer, and capable of being removed by irradiation with a laser beam; and an overprint varnish layer;

wherein the base layer and the masking layer are colored layers having different colors that are distinctly different from each other in lightness, the base layer comprises a multilayer structure having an upper base layer and a lower base layer, the upper base layer having a laser light absorptive power higher than that of the lower base layer and the lower base layer being colored in a color lighter than that of the upper base layer, and the overprint varnish layer and the masking layer are capable of transmitting the radiated laser beam, and the base layer is capable of absorbing the radiated laser beam so that, when the base layer absorbs the laser beam, the upper base layer receiving the laser beam radiation is removed and the lower base layer is retained, and the area of the overprint varnish layer and masking layer corresponding to that of the upper base layer is removed.

2. The laser-marking laminated structure according to claim 1, wherein the upper base layer is a black ink layer.

3. The laser-marking laminated structure according to claim 1, wherein the masking layer is an ink layer containing particles of a metal or a metal oxide.

4. The laser-marking laminated structure according to claim 1, wherein the upper base layer is an ink layer containing carbon black, and the lower base layer is an ink layer containing a coloring matter other than carbon black.

5. A laser-marking laminated structure consisting of:

a support element;

a base layer formed on one surface of the support element;

a masking layer formed on an exposed surface of the base layer, and capable of being removed by irradiation with a laser beam; and an overprint varnish layer;

wherein the base layer and the masking layer are colored layers having different colors that are distinctly different from each other in lightness, and the overprint varnish layer and the masking layer are capable of transmitting the radiated laser beam, and the base layer is capable of absorbing the radiated laser beam so that, when the base layer absorbs the laser beam, the base layer is retained, and the area of the overprint varnish layer and masking layer corresponding to that of the base layer is removed.

* * * * *